July 7, 1970

J. J. CAUBET 3,518,740

METHOD FOR INCREASING THE RESISTANCE TO THE
FRETTING CORROSION OF THE FRICTION SURFACE
OF TWO FERROUS METALLIC MEMBERS

Filed July 6, 1967

INVENTOR.
JACQUES JEAN CAUBET

BY John Traggenburger
AGENT

United States Patent Office 3,518,740
Patented July 7, 1970

3,518,740
METHOD FOR INCREASING THE RESISTANCE TO THE FRETTING CORROSION OF THE FRICTION SURFACE OF TWO FERROUS METALLIC MEMBERS
Jacques Jean Caubet, Saint-Etienne, France, assignor to Ing. C. Olivetti & C., S.p.A., Ivrea, Torino, Italy, a corporation of Italy
Filed July 6, 1967, Ser. No. 651,569
Claims priority, application Italy, July 8, 1966, 16,007/66
Int. Cl. B21d 53/10; B23p 11/00
U.S. Cl. 29—149.5      1 Claim

ABSTRACT OF THE DISCLOSURE

A method for increasing the resistance to the fretting corrosion of the friction surface of two ferrous metallic members, wherein the friction surface of a first member is coated with a layer of relatively hard metal and is provided with grooves adapted to reduce the time wherein the debris detached from said members remain in the friction area, the surface of the other member being coated with a relatively ductile metal adapted to generate a pad of debris downstream of the friction area.

BACKGROUND OF THE INVENTION

The present invention relates to a method for increasing the resistance to the fretting corrosion of the friction surface of two ferrous metallic members, wherein at least one of said members is moved, and wherein an external action causes a surface portion of a first one of said members to contact at each instant a surface portion of the other member on a friction area, the contacting surface portion of said first member being moved with a speed higher than the speed of the contacting surface portion of said other member.

To increase the resistance to the fretting corrosion, it is known to coat the two members with a layer of two metals having different hardness. However such a protection is insufficient since the debris detached therefrom remain in the friction area, thus causing an abrasive action.

Furthermore, it is already known to provide one of the friction surfaces with grooves to reduce the abrasion wear, for example in combination with a coat of plastic material, thus fractioning the friction area, or in combination with a treatment with salt bath for providing preferential paths to the intercrystalline diffusion in hypereutectoid manganese steel. However, even such a protection is insufficient if used on members of conventional carbon steel.

SUMMARY OF THE INVENTION

These disadvantages are obviated by the method for increasing the resistance to the fretting corrosion according to the invention, which is characterized in that the friction surface of said first member is provided with grooves adapted to reduce the time wherein the debris detached from said members remains in the friction area, the friction surface of said first member being coated with a layer of a relatively hard metal, the surface of the other member being coated with a relatively ductile metal adapted to generate a pad of debris downstream of the friction area.

This and other characteristics of the invention will become apparent from the following description of some preferred embodiments of the method, and from the accompanying drawings.

DESCRIPTION OF THE PREFERRED EMBODIMENTS OF THE INVENTION

Generally in a mechanical coupling of two ferrous metal members at least one of which is movable with respect to the other, for example a shaft 6 (FIG. 1) and a bearing formed of a hole 7 of a thin plate 8, some parasitic movements of little value but of high frequency occur and cause a rapid degradation of the contacting surfaces of the members of the coupling. This degradation is called fretting corrosion and is due to the particles or debris caused by wear, which remain a relatively long time in the friction area, and then become iron powder. This powder is subsequently transformed into ferric oxide $Fe_2O_3$ by the joint action of the oxygen and of the humidity of the midst and causes an abrasive action which rapidly increases the wear of the members of the coupling.

Generally a first one of the two members of the coupling is also subject to an external action which causes said first member to be moved with respect to the other member, which thus operates as a support. Normally the movable member is the shaft 6, whereas the support is the plate 8. Independently from which of the two members is moved, normally one of the two members is subject to another external action which generates a friction area, wherein in each instant a portion of the surface of one member contacts a portion of the surface of the other member. The latter action may have a constant or a variable direction, whereby the contacting surface portion is displaced with a different speed on the two members.

Figure 1:
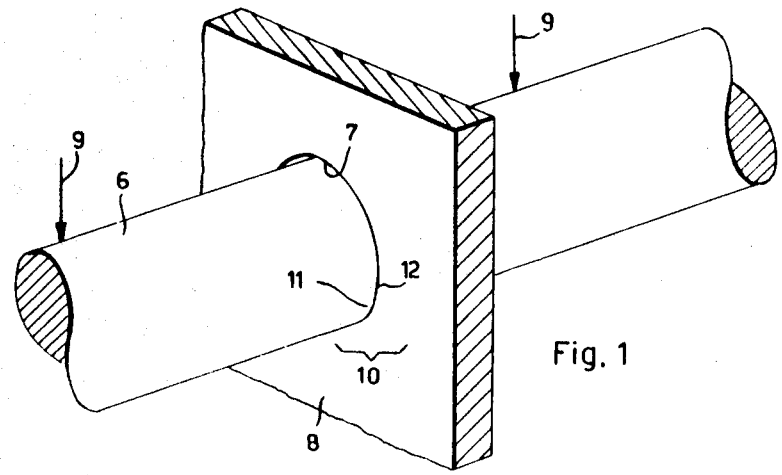
FIG. 1 is a perspective view of a coupling of two members according to the method of the invention.

In FIG. 1, the shaft 6 is subject to a pair of forces operating constantly downwards and indicated by two arrows 9. The forces 9 generate a friction area 10, wherein a portion 11 of the surface of the shaft 6 contacts a portion 12 of the surface of the hole 7. In this case the portion 12 is stationary, whereas the portion 11 rotates with the same speed of the shaft 6.

To increase the resistance to the fretting corrosion on one hand the friction surface wherein the displacing speed of the contacting portion is higher, is provided with grooves adapted to reduce the time wherein the debris detached from the two contacting members remain in the friction area, on the other hand the same friction surface is coated with a layer of a relatively hard metal, whereas the friction surface of the other member is coated with a relatively ductile metal and is adapted to generate a pad of debris downstream of the friction area. In fact, if the grooves receive the particles caused by the wear immediately after they are generated, the iron powder is not formed, whereby the fretting corrosion is enormously delayed or prevented. Furthermore, since the grooves are provided on the surface, the contacting portion of which is moved at a higher speed, the debris are rapidly removed from the friction area.

This result has been experimentally tested by means of a coupling comprising a shaft 6 (FIG. 1) made with cemented and hardened steel, the diameter of the shaft 6 is 5 mm., the shaft 8 being rotatably mounted into a hole 7 punched on a plate 8 made with medium hard steel of 1.2 mm. thickness. The coupling is lubricated with a drop of pure and neutral vaseline deposited into the friction area 10. The forces 9 have a constant direction, whereas the shaft 6 is rotated at 900 revolutions per minute. If the contacting surfaces of the shaft 6 and of the hole 7 are smooth, the ferric oxide powder is systematically generated within the first hour of operation.

Figure 2:
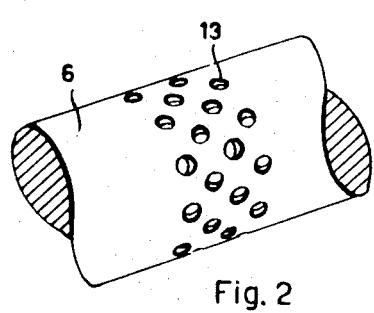
FIG. 2 is a member of the coupling according to a first embodiment of the method.

If, before cementing and hardening the surface of the shaft 6, this surface is engraved with holes or depressions 13 (FIG. 2) having 1 mm. diameter and depth 0.5 mm., and arranged as quincunx and mutually distanced 2 mm., in the same operating conditions as in the previous case, the ferric oxide powder is not generated within 15 hours of operation. The reason is that the debris generated by the wear are prevented from traveling in the direction of the movement more than 1 mm., whereas the time is insufficient to mill them and to permit the joint action of the oxygen and of the humidity of the midst to operate.

Figure 3:
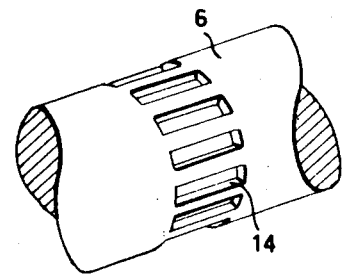
FIG. 3 is a member of the coupling according to another embodiment of the method.

If the shaft 6 is engraved with parallel grooves 14 (FIG. 3) long 1 mm., for example by knurling it, the ferric oxide powder is not generated before 30 hours operation.

Figure 4:
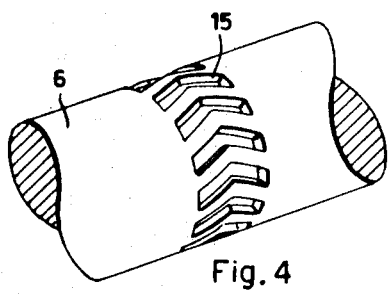
FIG. 4 is a member of the coupling according to a third embodiment of the method.

Furthermore, if the surface of the shaft is engraved with herringbone arranged grooves 15 (FIG. 4) orientated according to the rotating direction so that the debris fallen into the grooves are turned and urged sidewise out of the coupling, the ferric oxide powder is not generated before 40 hours of operation.

Figure 5:
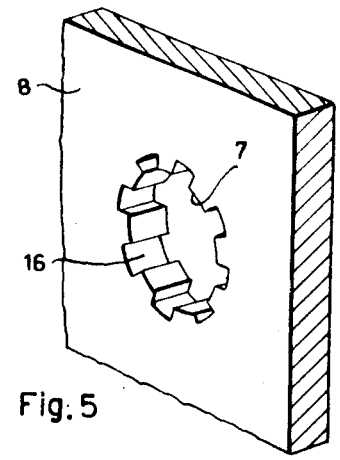
FIG. 5 is a member of the coupling according to further embodiment of the method.

Finally a test has been carried out on a coupling wherein the load is fixed with respect to the shaft 6 (FIG. 1), for example it is formed of an eccentric mass, whereby the portion of the contacting surface moved at higher speed is the portion 12 of the hole 7. If the surface of the hole 7 is provided with segment grooves 16 (FIG. 5) long 1 mm. and distanced 1 mm., it is observed that the ferric oxide powder is not generated before 30 hours of operation as in the case of FIG. 3.

The generation of the oxide powder is further delayed by coating the two coupling members with a pair of anticorrosion and antioxidant metals one of which is harder, for example nickel or chromium, whereas the other one is more ductile and substantially unadapted to form a solid solution with the harder metal.

It has been experimentally tested that if the movable member having the surface portion movable at higher speed is coated with the harder metal and the other member is coated with the more ductile metal, the stresses due to the friction generate a pad on the more ductile surface. Since this pad is moved downstream from the friction area 10, the pad is prevented from causing abrasion and therefore the fretting corrosion. On the contrary, such a corrosion is caused in a time three or four times shorter if the first named member is coated with the duticle metal coat since then the ductile metal pad is brought toward the friction area 10 (FIG. 1).

The test has been carried out on a coupling similar to that of FIG. 1, wherein the plate 8 is made with annealed XC 35f steel, having hardness 50 kg./mm.$^2$. The direction of the force oscillates through an angle 40 degrees, so that the contacting surface portion having the higher speed is the surface of the hole 7. The shaft 6 is coated with an electrolytic deposit of 5 microns of cadmium, whereas the hole 7 is coated with a deposit of 3 microns of chromium. The surface of the hole 7 is provided with segment grooves 16 (FIG. 5) wide 1 mm. and distanced 1 mm. The grooves 16 are arranged parallelly to the generatrix of the hole and therefore perpendicular to the motion direction. The coupling is lubricated with one drop of pure and neutral vaseline. By rotating the shaft 6 at 900 revolutions per minute it has been proved that the ferric oxide powder is not generated before 300 hours of uninterrupted operation. Therefore it becomes apparent that the coupling according to the method of the invention has performances 50 times higher than those of the known methods which always represent partial solutions of the problem.

What is claimed is:

1. A method of making a bearing of a ferrous metallic shaft rotating in a hole of a ferrous metallic thin plate having increased resistance to fretting corrosion, comprising: providing groove segments on the bearing surface of said shaft for removing debris from the area of frictional contact, arranging said segments at constant distance and orienting them in herringbone fashion so as to convey said particles of debris toward the two sides of the bearing, coating said shaft with a layer of chromium and coating the surface of said hole with cadmium to generate a pad of cadmium debris downstream from said area of frictional contact.

References Cited

UNITED STATES PATENTS

| 1,823,450 | 9/1931 | Helmond | 308—241 X |
| 1,956,014 | 4/1934 | Fink et al. | 308—241 X |
| 3,062,599 | 11/1962 | Campbell | 308—239 |

FOREIGN PATENTS

| 196,710 | 5/1923 | Great Britain. |

THOMAS H. EAGER, Primary Examiner

U.S. Cl. X.R.

308—241